United States Patent Office 2,858,308
Patented Oct. 28, 1958

2,858,308

9α-FLUORO-5α,22a-SPIROSTANES

Josef Fried and Josef E. Herz, New Brunswick, N. J., assignors to Olin Mathieson Chemical Corporation, New York, N. Y., a corporation of Virginia No Drawing. Application July 13, 1956
Serial No. 597,596

6 Claims. (Cl. 260—239.55)

This application is a continuation-in-part of our U. S. application, Serial No. 576,259, filed April 5, 1956.

This invention relates to the synthesis of valuable steroids and has for its object the provision of (I) an advantageous process of preparing cortisone, and (II) certain steroids of the spirostane series useful as intermediates in the preparation of cortisone.

The process of this invention essentially comprises: (a) interacting 11β,12β-epoxy-5α,22a-spirostane-3β-ol or a 3-ester thereof with hydrogen fluoride to form 9α-fluoro-5α,22a-spirostane-3β,12β-diol or a 3-ester thereof; (b) oxidizing the latter to the corresponding 9α-fluoro-5α,22a-spirostane-3β-ol-12-one 3-ester; (c) dehydrofluorinating the resultant compound to 9(11)-dehydrohecogenin; and (d) converting the dehydrohecogenin, by methods known in the art, to cortisone.

The new steroid intermediates of this invention are those of the general formula:

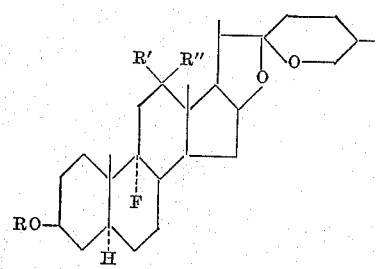

wherein R is hydrogen or acyl (particularly an acyl radical of a hydrocarbon carboxylic acid having less than ten carbon atoms), R' is hydrogen, R" is β-hydroxy or β-acyloxy (particularly an acyloxy radical of a hydrocarbon carboxylic acid having less than ten carbon atoms), and together R' and R" is keto.

To prepare the intermediates of this invention, 11β,12β-epoxy-5α,22a-spirostane-3β-ol or a 3-ester thereof (particularly an ester with a hydrocarbon carboxylic acid having less than ten carbon atoms as exemplified by the lower fatty acids) is interacted with hydrogen fluoride, preferably in an inert organic solvent. This reaction yields a mixture of products, as more fully detailed in said application, Serial No. 576,259, the major product being the desired 9α-fluoro-5α,22a-spirostane-3β,12β-diol or 3-ester thereof (if an esterified starting material is employed).

The 9α-fluoro derivative can then be acylated by treatment with an acyl halide or acid anhydride (particularly a chloride or anhydride of a hydrocarbon carboxylic acid having less than ten carbon atoms, as exemplified by acetic anhydride) in an organic solvent (particularly an organic base, such as pyridine), to yield the 3,12-diester.

The 9α-fluoro-5α,22a-spirostane-3β,12β-diol 3-ester can then be oxidized to the corresponding 12-keto derivative in the usual manner, as by treatment with chromic acid. The resultant 9α-fluoro-5α,22a-spirostane-3β-ol-12-one 3-ester can then be dehydrofluorinated to 9(11)-dehydrohecogenin by treatment with a base such as an alkali (e. g., potassium hydroxide), preferably in an organic medium, such as methanol.

The resultant 9(11)-dehydrohecogenin is a known compound which, after acylation (e. g., acetylation), can be hydrogenated to rockogenin acetate and the latter oxidized to hecogenin acetate by the method disclosed by Wagner et al., J. Amer. Chem. Soc., 73, 2494 (1951), and the latter converted to cortisone by methods known in the art (see Progress in the Chemistry of Organic Natural Products, volume 10, page 351, Springer, Vienna, 1953).

The following examples are illustrative of the invention (all temperatures being in centigrade):

EXAMPLE 1

*9α-fluoro-5α,22a-spirostane-3β,12β-diol 3-acetate*

Into a solution of 2 g. of 11β,12β-epoxy-5α,22a-spirostane-3β-ol 3-acetate in 76 ml. of chloroform and 4 ml. of absolute alcohol is passed with stirring at 0° a stream of hydrogen fluoride. After 10 minutes, two layers form, and the addition of hydrogen fluoride is terminated. After 75 minutes at 0°, the reaction mixture is neutralized with a suspension of sodium bicarbonate in water and the layers separated. The chloroform is washed with water, dried over sodium sulfate and evaporated to dryness in vacuo. The crystalline residue upon one crystallization from chloroform-alcohol furnishes pure 9α-fluoro-5α,22a-spirostane-3β,12β-diol 3-acetate, having the following properties: M. P. about 251–252°; $[\alpha]_D^{23}$ —70° (c, 0.96 in chloroform);

$$\lambda_{max.}^{Nujol} 2.69 \mu, 5.76 \mu$$

*Analysis.*—Calc. for $C_{29}H_{45}O_5F$ (492.65): C, 70.69; H, 9.21; F, 3.85. Found: C, 70.66; H, 9.02; F, 3.91.

The 12β-acetate of 9α-fluoro-5α,22a-spirostane-3β,12β-diol 3-acetate can be prepared by allowing a solution of 25 mg. of the compound in 0.5 ml. of pyridine and 0.5 ml. of acetic anhydride to remain at room temperature for 18 hours, and removing the reagents to yield a crystalline residue consisting of the 12β-acetate, which after recrystallization from 95% ethanol has the following properties: M. P. about 257–258°; $[\alpha]_D^{24}$ —75° (c, 0.98 in chloroform);

$$\lambda_{max.}^{Nujol} 5.77 \mu$$

*Analysis.*—Calc. for $C_{31}H_{42}O_6F$ (534.66): C, 69.64; H, 8.86. Found: C, 69.76; H, 8.61.

EXAMPLE 2

*9α-fluoro-5α,22a-spirostane-3β,12β-diol*

By substituting 11β,12β-epoxy-5α,22a-spirostane-3β-ol for the 3-acetate in the procedure of Example 1, 9α-fluoro-5α,22a-spirostane-3β,12β-diol is obtained.

EXAMPLE 3

*9α-fluoro-5α,22a-spirostane-3β-ol-12-one 3-acetate*

To a solution of 1.1 g. of 9α-fluoro-5α,22a-spirostane-3β,12β-diol 3-acetate in 110 ml. of acetone is added with stirring 1.3 ml. of a solution made up by dissolving 200 mg. of chromic acid and 320 mg. of concentrated sulfuric acid in 1 ml. of water. After the addition of 1 ml. of alcohol, water is added and the acetone removed in vacuo. The residual suspension is extracted with chloroform, the chloroform solution washed with water, dilute bicarbonate and again with water, dried over sodium sulfate and evaporated to dryness in vacuo. The resulting 9α-fluoro-5α,-22a-spirostane-3β-ol-12-one 3-acetate, after recrystallization from 95% alcohol, has the following properties: M. P. about 256–257°; $[\alpha]_D^{23}$ —24° (c, 1.16 in $CHCl_3$);

$\lambda_{max.}^{Nujol}$ 5.79, 5.84, 9.49, 10.23, 10.95, 11.15 $\mu$

*Analysis.*—Calc. for $C_{29}H_{43}O_5F$ (490.63): C, 70.99; H, 8.83. Found: C, 71.27; H, 8.63.

EXAMPLE 4

9(11)-dehydrohecogenin

A solution of 20 mg. of 9α-fluoro-5α,22a-spirostane-3β-ol-12-one 3-acetate in 2 ml. of 2½% KOH in methanol is refluxed for one hour, the resulting mixture diluted with water and the methanol removed in vacuo. The resulting suspension is extracted with chloroform, the chloroform extract washed with water, dried over sodium sulfate and evaporated to dryness in vacuo. Recrystallization from 95% alcohol gives the known 9(11)-dehydrohecogenin of the following properties: M. P. about 223–225°; $[\alpha]_D^{23}$ —10° (1.01 in $CHCl_3$);

$\lambda_{max.}^{alc.}$ 2.38 $m\mu$ ($\epsilon$=12,000)

Acetylation with pyridine and acetic anhydride, as described in Example 1, gives 9(11)-dehydrohecogenin acetate, M. P. 220–221°, identical in its infrared spectrum with an authentic sample.

The invention may be otherwise variously embodied within the scope of the appended claims.

We claim:
1. A compound of the general formula

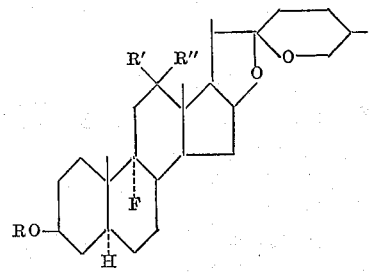

wherein R is selected from the group consisting of hydrogen and the acyl radical of a lower fatty acid, R' is hydrogen, R'' is selected from the group consisting of β-hydroxy and the β-acyloxy radical of a lower fatty acid, and together R' and R'' is keto.

2. An ester of 9α-fluoro-5α,22a-spirostane-3β,12β-diol and a lower fatty acid.

3. 9α-fluoro-5α,22a-spirostane-3β,12β-diol 3-acetate.

4. 9α-fluoro-5α,22a-spirostane-3β,12β-diol.

5. An ester of 9α-fluoro-5α,22a-spirostane-3β-ol-12-one and a lower fatty acid.

6. 9α-fluoro-5α,22a-spirostane-3β-ol-12 - one 3-acetate.

No references cited.